M. F. GRAYDON.
SILENCER FOR INTERNAL COMBUSTION ENGINES.
APPLICATION FILED OCT. 9, 1911.
1,017,536.
Patented Feb. 13, 1912.
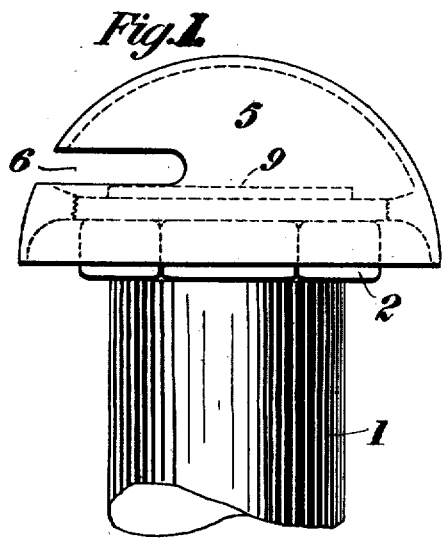
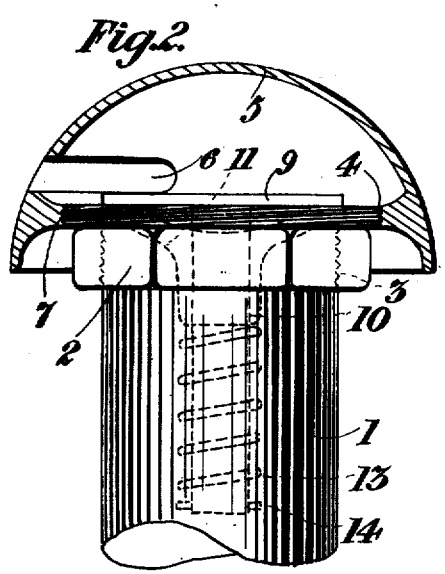
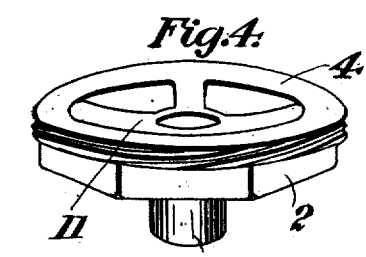
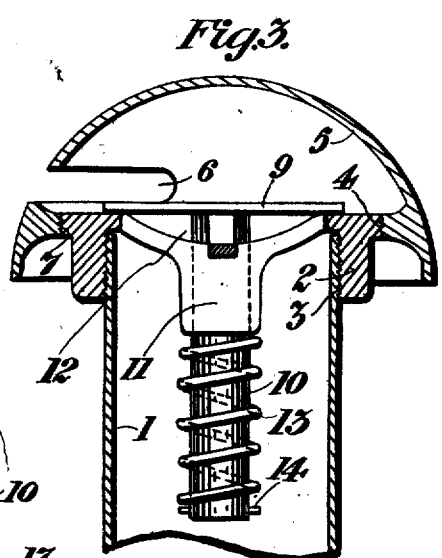
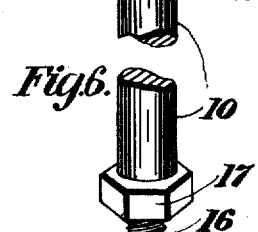
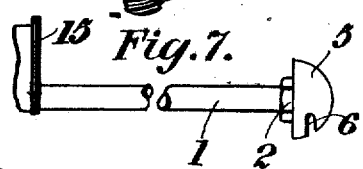
WITNESSES.
INVENTOR
M.F. GRAYDON

UNITED STATES PATENT OFFICE.

MARK FRANK GRAYDON, OF TRENTON, ONTARIO, CANADA.

SILENCER FOR INTERNAL-COMBUSTION ENGINES.

1,017,536. Specification of Letters Patent. Patented Feb. 13, 1912.

Application filed October 9, 1911. Serial No. 653,730.

*To all whom it may concern:*

Be it known that I, MARK FRANK GRAYDON, of the town of Trenton, in the county of Hastings, in the Province of Ontario, Canada, have invented certain new and useful Improvements in Silencers for Internal-Combustion Engines, of which the following is the specification.

My invention relates to improvements in silencers for internal combustion engines and the object of the invention, is to devise a silencer which can be applied to the exhaust pipe of an engine in conjunction with any form of muffler or expansion chamber at present in use.

The invention consists of a valve seat secured to the end of the exhaust pipe, a valve having a stem extending into the exhaust pipe, a spring on the stem for holding the valve normally in a closed position against the valve seat and a casing secured to the valve seat having a suitable exhaust aperture therein all as hereinafter more particularly described and illustrated in the accompanying drawing in which—

Figure 1, represents a side view of a silencer constructed according to my invention. Fig. 2, is a section through the casing thereof. Fig. 3, is a similar section to Fig. 2 through casing and pipe showing the valve exposed. Fig. 4, is a perspective detail of the valve seat. Fig. 5, is a perspective detail of the valve, the stem of which is broken away intermedially. Fig. 6, is a similar view to Fig. 5 of an alternative form of securing the spring on the stem of the valve. Fig. 7, is a side elevation showing the device applied to exhaust pipe and muffler.

Like letters of reference indicate corresponding parts in the different views.

1 is the exhaust pipe, and 2 is the valve seat internally threaded at 3, said valve seat portion being screwed on the exhaust pipe 1.

4 is an enlarged externally threaded portion of the valve seat.

5 is the casing with an exhaust aperture 6 therein and having an internal threaded portion 7 designed to be screwed onto the enlarged portion 4.

9 is the valve seating on the valve seat portion 2 and 10 is the stem thereof extending into the exhaust pipe 1.

11 is a spider acting as a bearing for the valve and formed in the hollow interior 12 of the valve seat.

13 is a spring mounted on the valve stem 10 and 14 is a pin for securing the spring thereon.

15 is a muffler or expansion chamber of suitable form connected in the exhaust between the engine and the silencer.

16 (Fig. 6) is a reduced shank on the end of the stem 10 and 17 is a nut threaded thereon and designed to secure the spring 13 on the stem 10 as an alternative form to the pin 14 (Fig. 5).

It is found that when a device of the nature devised is applied to the end of an exhaust pipe of an internal combustion engine in conjunction with the muffler or other suitable expansion chamber now commonly used, the noise of the exhaust is materially decreased without any appreciable reduction of power in the engine.

The operation of the device is as follows:—The exhaust gases rushing against the valve raises the same off the seat thus allowing the gases to escape into the casing and thence through the exhaust aperture into the air, the valve closing instantaneously thus preventing an inrush of air which it is claimed is largely responsible for the noise of the exhaust.

Many modifications may be made in the invention without departing from the spirit of the same or the scope of the claims and the form shown is to be taken in an illustrative and not in a limiting sense.

What I claim as my invention is:

1. In a silencing device for internal combustion engines having an exhaust pipe, a valve seat secured to the exhaust pipe, a spider secured to the valve seat, a valve, a stem on said valve slidably mounted in the spider, and means for holding the valve in a normal closed position against the valve seat and an expansion casing having a dome shaped top and an exhaust aperture below said top, as and for the purpose specified.

2. In a silencing device for internal combustion engines having an exhaust pipe, a valve seat embracing the discharge end of said exhaust pipe, a spider secured to the inner upper edge of said valve seat and extending within said exhaust pipe, a valve, a stem on said valve slidably mounted in said spider, a pin passing through the end of said stem, and a spring bearing against said pin at one end and against said spider at the other end adapted for holding the valve in normally closed position against the valve seat and an expansion casing having a dome shaped top and an exhaust aperture below said top.

3. In a silencing device for internal combustion engines, the combination with the exhaust pipe and muffler, of a subsidiary silencer comprising a hollow valve seat secured to the exhaust pipe, a spider formed in the interior of the valve seat, a valve above the valve seat, a stem extending below the valve and slidably mounted in the spider, and a spring mounted on the stem for holding the valve in a normally closed position against the valve seat and an expansion casing having a dome shaped top and an exhaust aperture below said top as and for the purpose specified.

4. In a silencing device for internal combustion engines, the combination with the exhaust pipe and muffler, of a subsidiary silencer comprising a hollow valve seat secured to the exhaust pipe and having an enlarged externally threaded portion at the top thereof, a spider formed in the interior of the valve seat, a valve above the seat, a stem extending below the valve and slidably mounted in the spider, and a spring mounted on the stem for holding the valve in a normally closed position against the valve seat and an expansion casing having a dome shaped top and an exhaust aperture below said top as and for the purpose specified.

5. A subsidiary silencer for internal combustion engines comprising a hollow valve seat secured to the exhaust pipe and having an enlarged externally threaded portion at the top thereof, a spider formed in the interior of the valve seat, a valve above the seat, a stem extending below the valve and slidably mounted in the spider, and a spring mounted on the stem for holding the valve in a normally closed position against the valve seat and an expansion casing having a dome shaped top and an exhaust aperture below said top as and for the purpose specified.

6. In a silencing device for internal combustion engines having an exhaust pipe, an internally threaded hollow valve seat secured to the exhaust pipe T shaped in cross section forming inner and outer annular shoulders, said outer shoulder being provided with threads, a spider integrally formed on said valve seat and depending within the exhaust, a valve above the seat, a stem below the valve and slidably mounted in the spider, a spring mounted on the stem for holding the valve in a normally closed position against the valve seat, and a dome shaped casing screw threaded upon said outer flange having a laterally discharging exhaust aperture below the top of said casing.

MARK FRANK GRAYDON.

Witnesses:
P. J. O'Rourke,
J. F. X. O'Rourke.